(12) United States Patent
Park et al.

(10) Patent No.: US 9,876,252 B2
(45) Date of Patent: Jan. 23, 2018

(54) RECHARGEABLE BATTERY

(71) Applicant: Samsung SDI Co., Ltd., Yongin-si, Gyeonggi-do (KR)

(72) Inventors: Sang-In Park, Yongin-si (KR); Eun-Young Goh, Yongin-si (KR); Ji-Woon Lee, Yongin-si (KR); Jin-Hyon Lee, Yongin-si (KR); Jin-Seon Shin, Yongin-si (KR); Sung-Yong Kim, Yongin-si (KR); Jong-Ki Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 27 days.

(21) Appl. No.: 15/055,456

(22) Filed: Feb. 26, 2016

(65) Prior Publication Data

US 2016/0260999 A1   Sep. 8, 2016

(30) Foreign Application Priority Data

Mar. 2, 2015   (KR) ........................ 10-2015-0029330

(51) Int. Cl.
| | |
|---|---|
| *H01M 2/06* | (2006.01) |
| *H01M 10/04* | (2006.01) |
| *H01M 2/30* | (2006.01) |
| *H01M 2/02* | (2006.01) |
| *H01M 4/75* | (2006.01) |

(52) U.S. Cl.
CPC ..... *H01M 10/0431* (2013.01); *H01M 2/0235* (2013.01); *H01M 2/06* (2013.01); *H01M 2/30* (2013.01); *H01M 4/75* (2013.01); *H01M 2220/30* (2013.01)

(58) Field of Classification Search
CPC .. H01M 10/0431; H01M 4/75; H01M 2/0235; H01M 2/06; H01M 2/30; H01M 2220/30
See application file for complete search history.

(56) References Cited

U.S. PATENT DOCUMENTS

| | | | |
|---|---|---|---|
| 6,287,719 B1 * | 9/2001 | Bailey .................... | H01M 6/10 429/159 |
| 2003/0013014 A1 * | 1/2003 | Ashihara ............. | H01M 2/0235 429/174 |
| 2014/0220400 A1 * | 8/2014 | Kwon .................. | H01M 10/05 429/94 |

FOREIGN PATENT DOCUMENTS

| | | |
|---|---|---|
| KR | 20-2008-0005088 U | 10/2008 |
| KR | 10-2014-0076158 A | 6/2014 |

* cited by examiner

*Primary Examiner* — Cynthia K Walls
(74) *Attorney, Agent, or Firm* — Knobbe Martens Olson & Bear LLP (57) ABSTRACT

Disclosed is a pin-type rechargeable battery having a micro diameter for increasing an energy density at a preset volume. The rechargeable battery includes: an electrode assembly formed by winding a second electrode around an external circumference of a first electrode disposed at a center thereof by interposing a separator; a case to receive the electrode assembly and an electrolyte solution therein and electrically connected to the second electrode; a terminal electrically connected to the first electrode and drawn outside of the case; and a gasket disposed between the terminal and an opening of the case to close the opening of the case.

20 Claims, 8 Drawing Sheets

RECHARGEABLE BATTERY

RELATED APPLICATIONS

This application claims priority to and the benefit of Korean Patent Application No. 10-2015-0029330 filed in the Korean Intellectual Property Office on Mar. 2, 2015, the entire contents of which are incorporated herein by reference.

BACKGROUND

Field

This disclosure relates to a pin-type of rechargeable battery having a micro diameter.

Description of the Related Art

A rechargeable battery may be classified into a small cylindrical or square battery and a large square battery according to the size and capacity. With the development and demand of a technology for a mobile device, demand for the small cylindrical rechargeable battery and the small square rechargeable battery as an energy source has increased.

In general, the rechargeable battery includes an electrode assembly wound having a jelly roll shape by disposing electrodes at both surfaces of a separator, respectively, a case to receive the electrode assembly therein, and a cap assembly to close and seal an open side of the case.

With the development of mobile devices, peripheral devices such as a touch pen and a stylus pen having a diameter of several mm have been developed and used. A rechargeable battery to be used in the above devices having a micro diameter is not developed.

Further, the electrode assembly according to the related art is applied to the rechargeable battery of a micro diameter, a negative electrode, since a separator and a positive electrode are wound around a center pin, volume of the electrode assembly is increased. Accordingly, the rechargeable battery has low energy density at a preset volume.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present invention has been made in an effort to provide a rechargeable battery having advantages of forming a pin-type battery having a micro diameter. The present invention further provides a rechargeable battery for increasing an energy density at a preset volume.

An exemplary embodiment of the present invention provides a rechargeable battery including: an electrode assembly formed by winding a second electrode around an external circumference of a first electrode disposed at a center thereof by interposing a separator; a case to receive the electrode assembly and an electrolyte solution therein and electrically connected to the second electrode; a terminal electrically connected to the first electrode and drawn outside of the case; and a gasket disposed between the terminal and an opening of the case to close the opening of the case.

The second electrode may be wound at two turns or less around the external circumference of the first electrode.

The first electrode may be formed by coating a box or a pole made of a mesh member with an active material.

The first electrode may include: a coated region corresponding to the second electrode; and an uncoated region formed of the mesh member corresponding to the gasket and connected to the terminal.

The first electrode may be formed by coating a conductive member having porosity and conductivity with an active material.

The second electrode may include: a coated region including a region where a current collector formed of a metal thin plate is coated with an active material; and an uncoated region including a region that is not coated with the active material such that a current collector is exposed, wherein the uncoated region may make surface contact with an inner surface of the case to be electrically connected to the case.

A diameter of the first electrode may be greater than a thickness of the second electrode.

The first electrode may include a three-dimensional member formed by a current collector and an active material.

The first electrode may be formed of a porous pole.

The current collector may be formed of a metal fiber, and the first electrode may be formed by mixing the current collector with a particulate active material and compressing the mixture.

As described above, according to an exemplary embodiment of the present invention, since the electrode assembly is formed by winding the second electrode around an external circumference of the first electrode disposed at a center thereof by interposing the separator, a pin-type rechargeable battery having a micro diameter may be provided.

Since the first electrode is formed of a porous mesh member or a three-dimensional member and the first electrode forms a wider ion exchange area with the second electrode while receiving an electrolyte solution therein, the energy density may be increased at preset volume of the rechargeable battery.

DETAILED DESCRIPTION OF CERTAIN INVENTIVE EMBODIMENTS

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
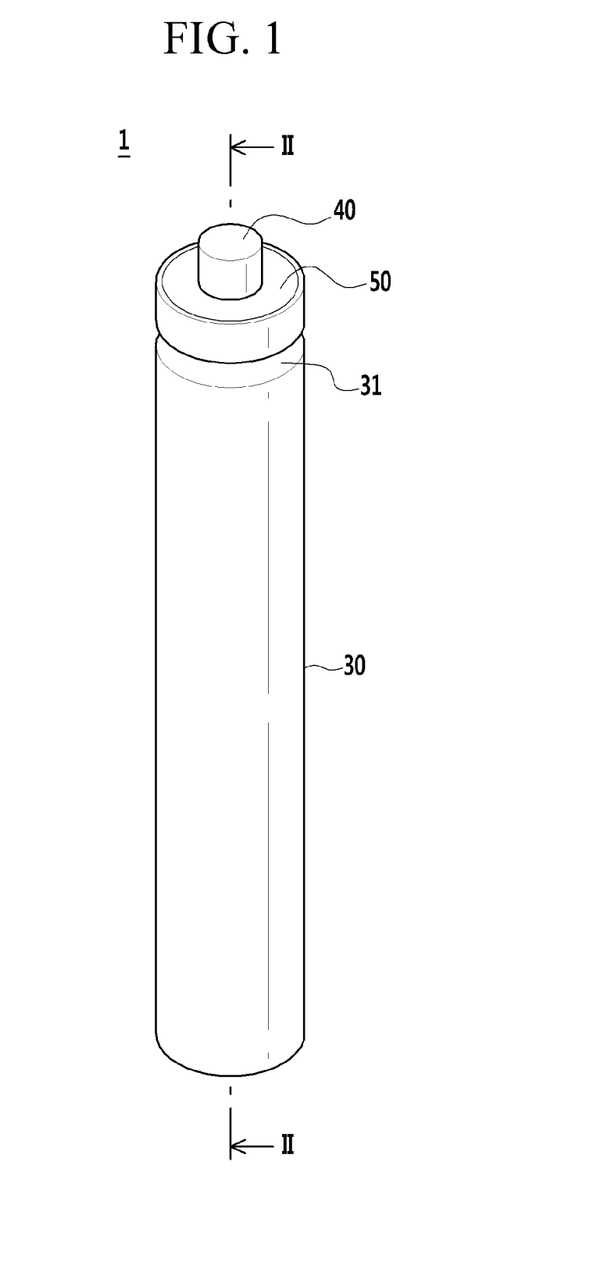
FIG. 1 is a perspective view illustrating a rechargeable battery according to a first exemplary embodiment of the present invention.

FIG. 1 is a perspective view illustrating a rechargeable battery according to a first exemplary embodiment of the present invention. Referring to FIG. 1, the rechargeable battery 1 according to the first exemplary embodiment includes a pin-type battery having a several millimeter diameter, for example, a diameter of 2 mm to 5 mm.

Figure 2:
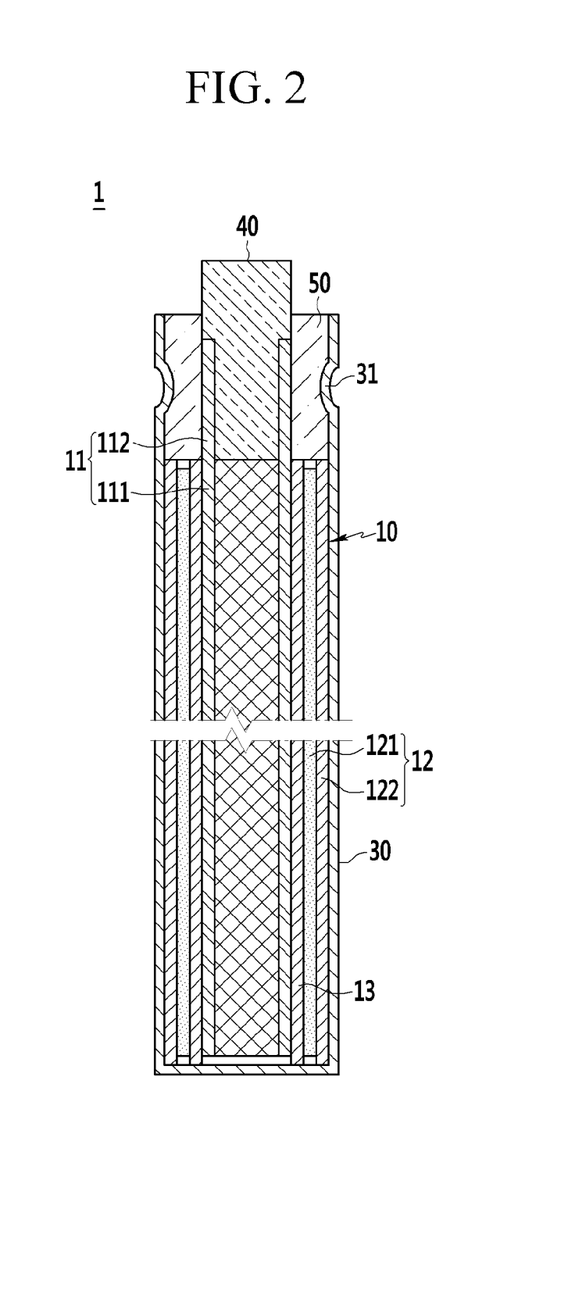
FIG. 2 is a cross-sectional view taken along line II-II of FIG. 1.

FIG. 2 is a cross-sectional view taken along line ||-|| of FIG. 1. Referring to FIG. 2, the rechargeable battery 1 according to the first exemplary embodiment includes an electrode assembly 10 which is charged or discharged, a case 30 to receive the electrode assembly 10 and an electrolyte solution therein, a terminal 40 connected to the electrode assembly 10 and be drawn out to the outside, and a gasket 50 interposed between the terminal 40 and an opening of the case 30.

The electrode assembly 10 is formed by winding a second electrode 12 (i.e., a positive electrode) around an external circumference of a first electrode 11 (i.e., a negative electrode) disposed at a center while interposing the separator 13. Further, although not shown, the first electrode and the second electrode may be formed as a positive electrode and a negative electrode, respectively.

Figure 3:
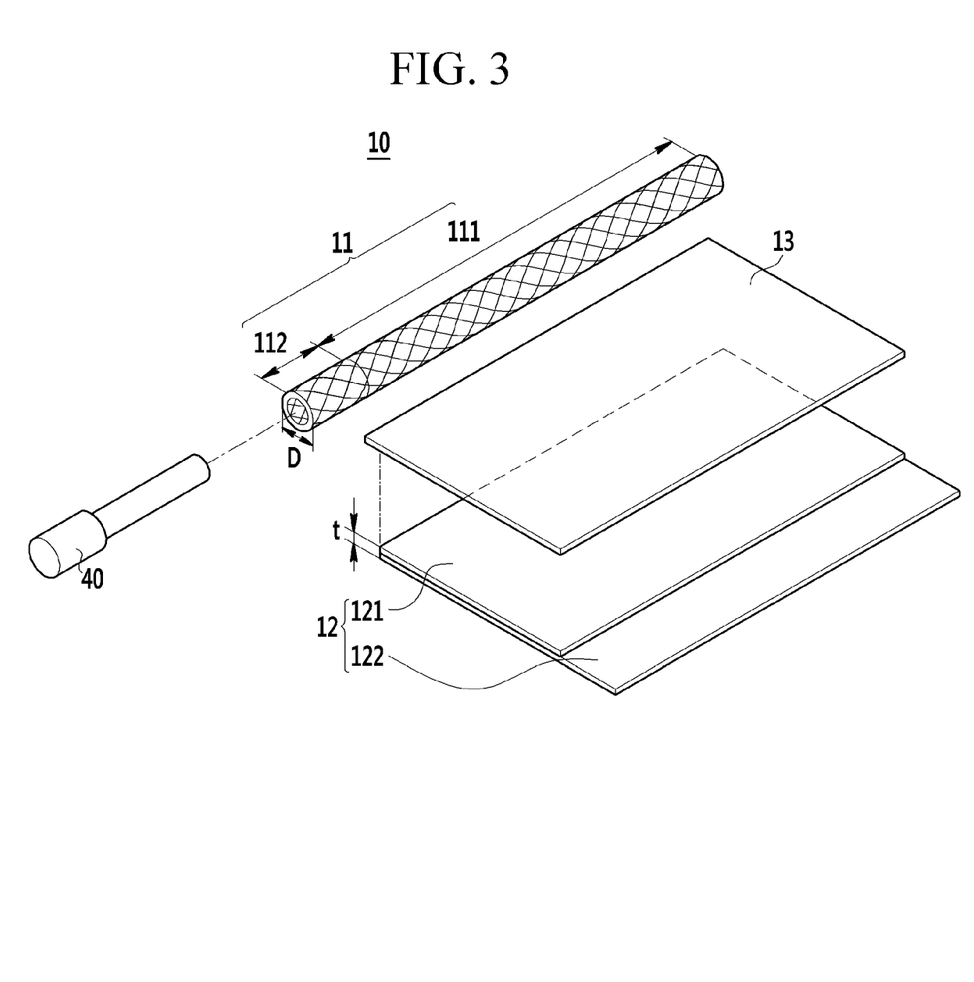
FIG. 3 is an exploded perspective view illustrating an electrode assembly shown in FIG. 2.
Figure 4:
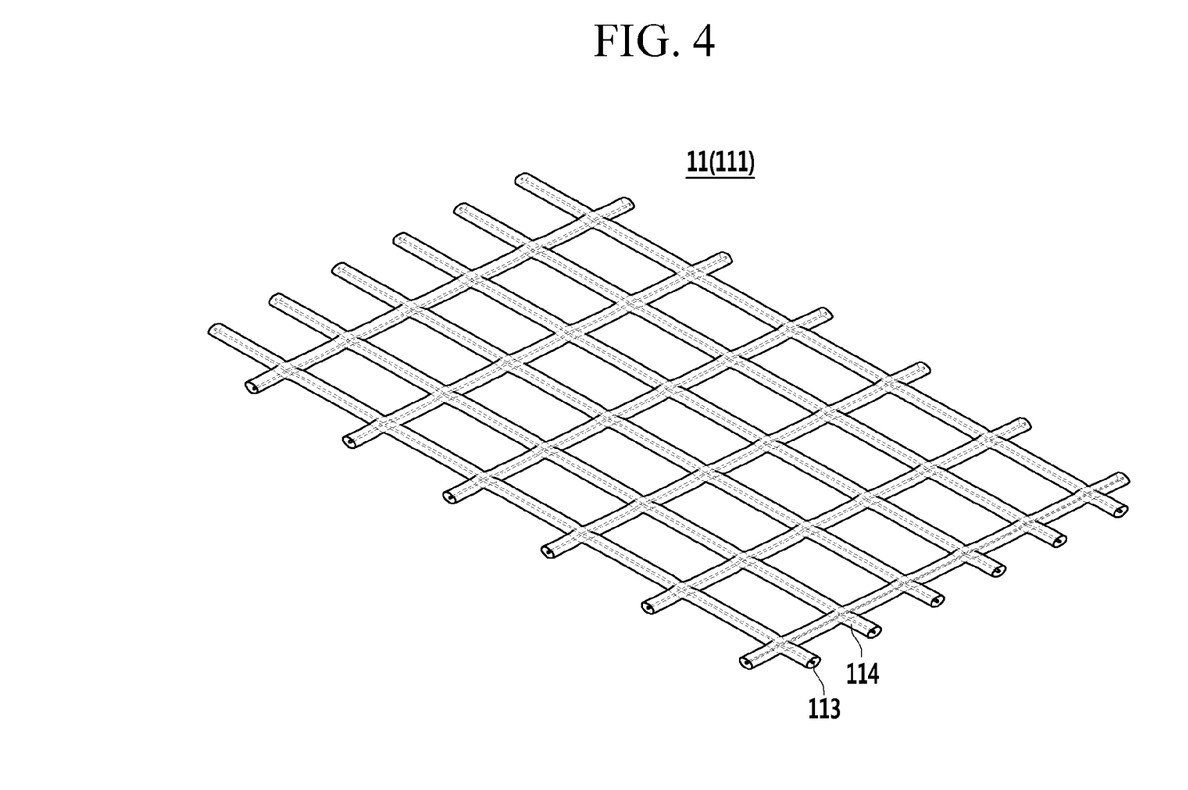
FIG. 4 is a partial perspective view illustrating a mesh member shown in FIG. 3 coated with an active material.

FIG. 3 is an exploded perspective view illustrating an electrode assembly shown in FIG. 2, and FIG. 4 is a partial perspective view illustrating a mesh member shown in FIG. 3 coated with an active material.

Referring FIG. 2 to FIG. 4, the negative electrode 11 is formed by coating a conductive member having porosity and conductivity with an active material. For example, the negative electrode 11 is formed by forming a box or a pole with a mesh member 113, and coating the box or the pole with an active material 114.

For example, the mesh member 113 is formed of a copper cylinder to easily wind the separator 13 and the positive electrode 12 which are disposed at an external circumference thereof. Moreover, the mesh member 113 is disposed at a center of the electrode assembly 10 and provides mechanical strength which is resistant to modification of the electrode assembly 10, and serves as a center pin in the rechargeable battery according to the related art.

The negative electrode 11 includes a coated region 111 and an uncoated region 112 formed in a longitudinal direction (vertical direction of FIG. 2). The coated region 111 corresponds to the positive electrode 12 and is formed by coating the mesh member 113 with an active material 114. The uncoated region 112 is formed of the mesh member 113 which is exposed because the mesh member 113 is not coated with the active material.

The uncoated region 112 is electrically connected to the terminal 40 corresponding to the gasket 50. The terminal 40 may be press-fitted or welded with the mesh member 113 to set the uncoated region 112. For the purpose of firm welding with a copper mesh member 113, the terminal 40 may be made of copper.

The positive electrode 12 includes a coated region 121 including a region where one surface of a current collector formed of a metal thin plate (i.e., an Al foil) coated with an active material and an uncoated region 122 including a current collector which is not coated with the active material to be exposed.

The uncoated region 122 of the positive electrode 12 has a preset width in a wound direction, and is formed in a longitudinal direction of the electrode assembly 10 along a longitudinal direction of the negative electrode 11. Accordingly, the uncoated region 122 makes surface contact with an inner surface of the case 30 to have a preset width while being connected to the case 30.

The terminal 40 is connected to the negative electrode 11, and the case 30 is connected to the positive electrode 12. Accordingly, the mesh member 113 of the negative electrode 11 and the terminal 40 may be made of copper, and the current collector of the positive electrode 12 may be made of aluminum.

In this way, the negative electrode 11 does not include a separate negative electrode tab and directly connects the uncoated region 112 formed by the mesh member 113 to the terminal 40, and the positive electrode 12 does not include a separate positive electrode tab and directly makes contact with the uncoated region 122 with an inner surface of the case 30. Accordingly, the number of components in the negative electrode 11 and the positive electrode 12 may be reduced, and a manufacturing process of the rechargeable battery 1 may be simplified.

Moreover, since the negative electrode 11 is formed as a cylinder of the mesh member 113 and disposed at a center of the electrode assembly 10, the center pin may be removed as compared with a structure of winding a negative electrode around a center pin according to the related art. Accordingly, a volume of the electrode assembly 10 is reduced, and the energy density may be increased at a preset volume of the rechargeable battery 1.

Since the negative electrode 11 is formed by coating the mesh member 113 with the active material 114, the electrolyte solution may flow through inside and outside of the negative electrode 11 through the mesh member 113, and the active material 114 may be coated at the inside of the mesh member 113. That is, since there is a sufficient amount of the electrolyte solution in the electrode assembly 10, and an ion exchange area with the positive electrode 12 is wide in the negative electrode 11, the energy density may be increased.

Figure 5:
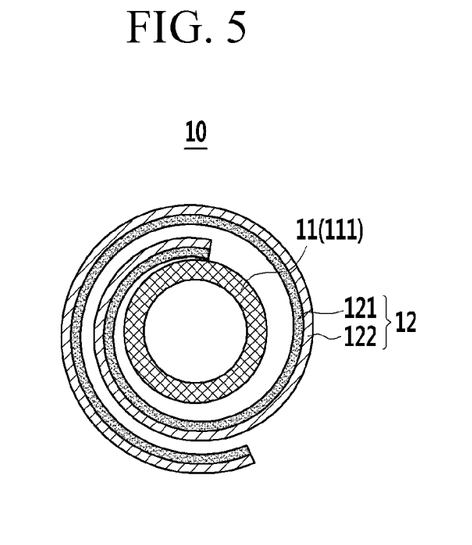
FIG. 5 is a transverse cross-sectional view illustrating a configuration of the electrode assembly shown in FIG. 2 from which a separator is omitted.

A diameter D of the negative electrode 11 is greater than a thickness t of the positive electrode 12. That is, even if the negative electrode 11 is disposed at a center of the electrode assembly 10 so that a corresponding area between the negative electrode 11 and the positive electrode 12 is limited, the diameter D of the negative electrode 11 may have necessary capacity in the rechargeable battery 1.

FIG. 5 is a transverse cross-sectional view illustrating a configuration of the electrode assembly shown in FIG. 2 from which a separator is omitted. Referring to FIG. 5, the negative electrode 11 is disposed at a center of the electrode assembly 10, and the positive electrode 12 of two turns or less is wound around the external circumference of the negative electrode 11. In this case, the negative electrode 11 may face the positive electrode 12 at the whole region of the circumference.

Figure 6:
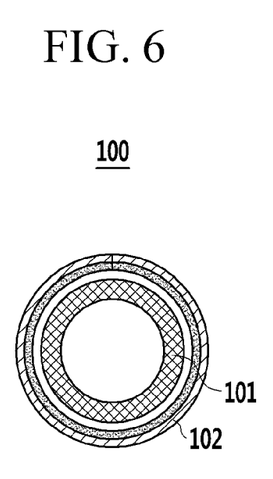
FIG. 6 is a transverse cross-sectional view illustrating a configuration of a modified electrode assembly shown in FIG. 2 from which a separator is omitted.

FIG. 6 is a transverse cross-sectional view illustrating a configuration of a modified electrode assembly shown in FIG. 2 from which a separator is omitted. Referring to FIG. 6, the negative electrode 101 is disposed at a center of the electrode assembly 100, and the positive electrode 102 of one turn is wound around an external circumference of the negative electrode 101. In this case, the positive electrode 102 may face the circumference of the negative electrode 101 to have a minimum size.

As shown in FIG. 5 and FIG. 6, when the negative electrode 11 or 101 is disposed at a center of the electrode assembly 10 or 100, the positive electrode 102 of only one turn may be wound (see FIG. 6). In this case, both ends of the positive electrode 102 may become wider. In this case, the external circumference of the negative electrode 101 may not partially correspond to the positive electrode 102. In this case, the energy density may be deteriorated.

Since the positive electrode 12 is wound around the negative electrode 11 of one to two turns, the whole circumference region of the negative electrode 11 corresponds to the positive electrode 12 (see FIG. 5). Accordingly, the energy density may be inhibited from being deteriorated.

Referring back to FIG. 1 and FIG. 2, an opening is formed at a side of the case 30 so that the electrode assembly 10 may be inserted from the outside. The case 30 has a cylindrical shape to receive a cylindrical electrode assembly 10. The case 30 forms a pin-type rechargeable battery 1 having a micro diameter, and sets an exterior diameter.

In a state that the electrode assembly 10 is mounted, the uncoated region 122 of the positive electrode 12 is electrically connected to the case 30. For example, the uncoated region 122 of the positive electrode 12 disposed at the external circumference of the electrode assembly 10 may make contact with an inner surface of the case 30. That is, the uncoated region 122 of the positive electrode 12 is electrically connected to the inner surface of the case 30 by inserting the electrode assembly 10 into the case 30.

For example, the current collector and the uncoated region 122 of the positive electrode 12 may be made of aluminum, and the case 30 may be made of aluminum or stainless steel. Since the uncoated region 122 makes surface contact with an inner surface of the case 30, unlike when welded, when a material of the uncoated region 122 is different from a material of the case 30, an electrical connection may be efficiently maintained.

Accordingly, the case 30 is connected to the uncoated region 122 of the positive electrode 12, and serves as a positive terminal in the rechargeable battery 1. The terminal 40 is connected to an uncoated region 112 of the negative electrode 11 and extends outside of the case 30, which serves as a negative terminal.

Although not shown, when the first and second electrodes are formed as the positive and negative electrodes, the case is connected to the uncoated region of the negative electrode, and serves as the negative terminal in the rechargeable battery. The terminal is connected to the uncoated region of the positive electrode and extends outside of the case, and may serve as the positive terminal.

The gasket 50 is interposed between the terminal 40 and an opening of the case 30 and electrically insulates the terminal 40 from the case 30, and closes the electrode assembly 10 and the case 30 to receive the electrolyte solution.

After the gasket 50 is inserted into an opening of the case 30, the gasket 50 is fixed in the opening of the case through a crimping process so that the rechargeable battery 1 is achieved. In this case, a beading part 31 is recessed in a center of a diameter direction of the case at an opening of the case 30.

The beading part 31 is recessed at a center of a diameter direction in a lateral direction of a terminal 40 and the uncoated region 112 of the negative electrode 11 which adhere closely to each other. Accordingly, when the beading part 31 of the case 30 compresses the gasket 50, the bonding force between the terminal 40, the uncoated region 112, and the beading part 31 may be improved. For example, the gasket 50 may be formed of a rubber stopper.

In the following description of the second embodiment, the same constituent elements as those of the first embodiment will be omitted and only different constituent elements will be described.

Figure 7:
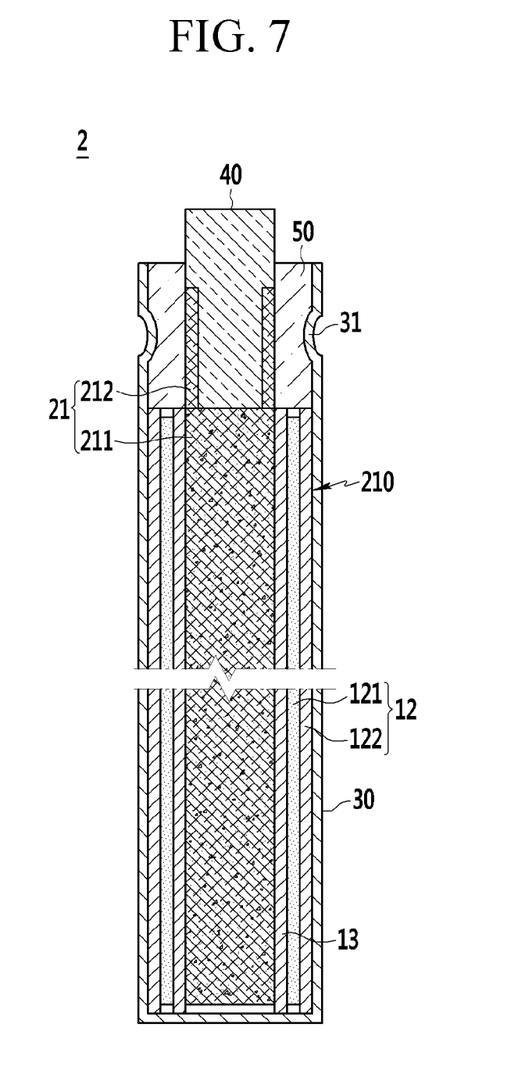
FIG. 7 is a cross-sectional view illustrating a rechargeable battery according to a second exemplary embodiment of the present invention.
Figure 8:
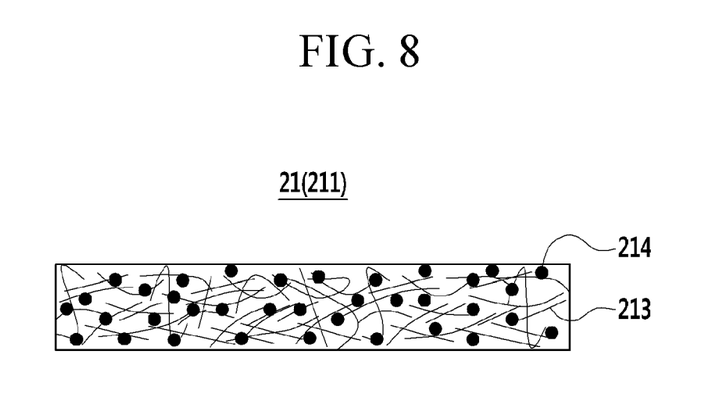
FIG. 8 is a cross-sectional view illustrating a three-dimensional member formed of a current collector and an active material shown in FIG. 7.

FIG. 7 is a cross-sectional view illustrating a rechargeable battery according to a second exemplary embodiment of the present invention, and FIG. 8 is a cross-sectional view illustrating a three-dimensional member formed of a current collector and an active material shown in FIG. 7.

Referring to FIG. 7 and FIG. 8, in the rechargeable battery 2 according to the second exemplary embodiment, a negative electrode 21 includes a three-dimensional member formed by a current collector 213 and an active material 214. That is, the negative electrode 21 may formed of a porous pole.

The current collector 213 is made of a metal fiber having conductivity. The three-dimensional member forming the negative electrode 21 may be formed by mixing the current collector 213 with a particulate active material 214 and compressing the mixture.

The negative electrode 21 formed of the porous pole is disposed at the center of the electrode assembly 210 and provides mechanical strength which is resistant to modification of the electrode assembly 210, and serves as a center pin according to the related art.

The negative electrode 21 includes a coated region 211 and an uncoated region 212 which are formed in the longitudinal direction. The coated region 211 corresponds to the positive electrode 12 and is made of a compression mold of the mixed current collector 213 and active material 214. The uncoated region 212 is formed of a compressed current collector 213 which is not mixed with the active material.

The uncoated region 212 is electrically connected to the terminal 40 corresponding to the gasket 50. The terminal 40 may be press-fitted or welded with the current collector to set the uncoated region 112. When the terminal 40 is made of copper, the uncoated region 212 and the current collector 213 may be made of copper for the purpose of firm welding with the terminal 40.

In addition, since the negative electrode 21 is formed of the circular cylinder and is disposed at a center of the electrode assembly 210, the center pin may be removed as compared with a structure of winding a negative electrode around the center pin according to the related art. Accordingly, the volume of the electrode assembly 210 may be reduced, and the energy density may be increased at a preset volume of the rechargeable battery 2.

Since the negative electrode 21 is formed by mixing the current collector 213 of the metal fiber with the active material 214 and compressing the mixture, the electrolyte solution may flow through inside and outside of the negative electrode 21 through the metal fibers of the current collector 213, and the active material 214 may be compressed into insides of the metal fibers of the current collector 213. That is, since there is a sufficient amount of the electrolyte solution in the electrode assembly 210, and an ion exchange area with the positive electrode 22 is wide in the negative electrode 21, the energy density may be increased.

A diameter D of the negative electrode 21 is greater than a thickness t2 of the positive electrode 22. That is, even if the negative electrode 21 is disposed at a center of the electrode assembly 210 so that a corresponding area between the negative electrode 21 and the positive electrode 12 is limited, the diameter D of the negative electrode 21 may have necessary capacity in the rechargeable battery 2.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
an electrode assembly formed by winding a second electrode around an external circumference of a first electrode disposed at a center thereof by interposing a separator;
a case to receive the electrode assembly and an electrolyte solution therein and electrically connected to the second electrode;
a terminal electrically and directly physically connected to the first electrode inside of the case and drawn outside of the case so as to be exposed outside of the case; and
a gasket disposed between the terminal and an opening of the case to close the opening of the case.

2. The rechargeable battery of claim 1, wherein the second electrode is wound at two turns or less around the external circumference of the first electrode.

3. The rechargeable battery of claim 1, wherein the first electrode is formed by coating a box or a pole made of a mesh member with an active material.

4. The rechargeable battery of claim 3, wherein the first electrode comprises:
a coated region corresponding to the second electrode such that the coated region of the first electrode is covered by the second electrode; and
an uncoated region formed of the mesh member corresponding to the gasket and connected to the terminal.

5. The rechargeable battery of claim 1, wherein the first electrode is formed by coating a conductive member having porosity and conductivity with an active material.

6. The rechargeable battery of claim 1, wherein the second electrode comprises:
a coated region including a region where a current collector formed of a metal thin plate is coated with an active material; and
an uncoated region including a region that is not coated with the active material such that a current collector is exposed,
wherein the uncoated region makes surface contact with an inner surface of the case to be electrically connected to the case.

7. The rechargeable battery of claim 6, wherein a diameter of the first electrode is greater than a thickness of the second electrode.

8. The rechargeable battery of claim 1, wherein the first electrode comprises a three-dimensional member formed by a current collector and an active material.

9. The rechargeable battery of claim 8, wherein the first electrode is formed of a porous pole.

10. The rechargeable battery of claim 9, wherein the current collector is formed of a metal fiber, and
the first electrode is formed by mixing the current collector with a particulate active material and compressing the mixture.

11. A rechargeable battery comprising:
a first electrode formed into a hollow cylinder having a first and a second end and an outer circumference;
a separator that extends about the outer circumference of the first electrode;
a second electrode that extends around the separator and the outer circumference of the first electrode so that the separator is interposed between the first and second electrode;
a case that receives the first and second electrode and the separator the case having a first having an opening and a second end;
a terminal electrically and directly physically connected to the first electrode inside of the case and drawn outside of the case via the first end of the case so as to be exposed outside of the case; and
a gasket disposed between the terminal and the opening in the first end of the case.

12. The rechargeable battery of claim 11, wherein the second electrode is wound at two turns or less around the external circumference of the first electrode.

13. The rechargeable battery of claim 11, wherein the first electrode is formed by coating a box or a pole made of a mesh member with an active material.

14. The rechargeable battery of claim 13, wherein the first electrode comprises:
a coated region corresponding to the second electrode such that the coated region of the first electrode is covered by the second electrode; and
an uncoated region formed of the mesh member corresponding to the gasket and connected to the terminal.

15. The rechargeable battery of claim 11, wherein the first electrode is formed by coating a conductive member having porosity and conductivity with an active material.

16. The rechargeable battery of claim 11, wherein the second electrode comprises:
a coated region including a region where a current collector formed of a metal thin plate is coated with an active material; and
an uncoated region including a region that is not coated with the active material such that a current collector is exposed,
wherein the uncoated region makes surface contact with an inner surface of the case to be electrically connected to the case.

17. The rechargeable battery of claim 11, wherein a diameter of the first electrode is greater than a thickness of the second electrode.

18. The rechargeable battery of claim 16, wherein the first electrode comprises a three-dimensional member formed by a current collector and an active material.

19. The rechargeable battery of claim 17, wherein the first electrode is formed of a porous pole.

20. The rechargeable battery of claim 18, wherein the current collector is formed of a metal fiber, and
the first electrode is formed by mixing the current collector with a particulate active material and compressing the mixture.

* * * * *